United States Patent [19]

Kobayashi et al.

[11] 4,332,919
[45] Jun. 1, 1982

[54] MULTIPLY GRAFTED ANTISTATIC RESIN COMPOSITION

[75] Inventors: Akio Kobayashi; Takeo Ogihara, both of Iwaki, Japan

[73] Assignee: Kureha Kagaku Kogyo Kabushiki Kaisha, Tokyo, Japan

[21] Appl. No.: 269,663

[22] Filed: Jun. 2, 1981

[30] Foreign Application Priority Data

Jun. 10, 1980 [JP] Japan .................................. 55-77951

[51] Int. Cl.³ .......................................... C08F 265/06
[52] U.S. Cl. ........................... 524/504; 260/29.6 RW; 260/29.7 UP; 525/287; 525/291; 525/293; 525/303; 524/531; 524/533; 524/534; 525/74; 525/79; 525/80; 525/84
[58] Field of Search ............... 525/293, 303, 305, 309, 525/902; 260/29.6 RB, 29.6 RW, 29.7 UP, 29.7 UA

[56] References Cited

U.S. PATENT DOCUMENTS

| | | | |
|---|---|---|---|
| 3,562,235 | 2/1971 | Ryan | 260/29.6 |
| 3,745,196 | 7/1973 | Lane | 260/29.6 RB |
| 3,787,522 | 1/1974 | Dickie | 525/309 |
| 3,793,402 | 2/1974 | Owens | 525/902 |
| 3,804,925 | 4/1974 | Kato | 260/29.6 RB |
| 3,812,205 | 5/1974 | Dunkelberger | 260/29.6 RB |
| 3,971,835 | 7/1976 | Myers | 260/17 R |
| 4,052,525 | 10/1977 | Ide | 260/29.6 RB |
| 4,173,600 | 11/1979 | Kishida | 525/76 |

*Primary Examiner*—Paul R. Michl
*Attorney, Agent, or Firm*—Wenderoth, Lind & Ponack

[57] ABSTRACT

A multiply grafted copolymer is obtained by graft-polymerizing onto non-elastic trunk polymer particles (a) a monomer mixture (b) comprising an elasticity-imparting monomer selected from conjugated dienes and acrylates, a polyalkylene oxide monomer comprising 4 to 500 alkylene oxide groups together with a terminal double bond and an optional ethylenically unsaturated monomer, and an ethylenically unsaturated monomer (c) in order. An antistatic resin composition comprising this multiply grafted copolymer alone or a mixture of this copolymer and a thermoplastic resin compatible therewith can utilize the rubbery polymer component (b) more effectively than an antistatic resin composition comprising a graft copolymer obtained by graft-polymerizing an ethylenically unsaturated monomer (c) onto a trunk polymer comprising a mere copolymer of a monomer mixture (b), and thus can provide an improved antistatic effect.

8 Claims, No Drawings

MULTIPLY GRAFTED ANTISTATIC RESIN COMPOSITION

BACKGROUND OF THE INVENTION

The present invention relates generally to a resin composition possessing an antistatic property that is not practically lowered by washing or wiping, and more particularly to an antistatic resin composition comprising a multiply grafted or multilayer graft copolymer alone or a mixture of the multiply grafted copolymer and a thermoplastic resin compatible therewith, the multiply grafted copolymer comprising a core non-elastic or hard resin layer, an intermediate rubbery or elastic graft layer comprising an elasticity-imparting monomer selected from conjugated dienes and acrylates and a polyalkylene oxide monomer, and an outermost non-elastic or hard resin layer.

In general, plastics have high electrical resistance and tend to be easily charged with static electricity due to friction or peeling. For this reason, plastics are liable to attract dust and dirt, resulting in various troubles such as impairment of the appearances of shaped articles, sheets, films and fibers formed from these plastics.

Methods for imparting antistatic property to such plastics that are susceptible to static electricity have been investigated and can be roughly classified as follows.

1. Methods which involve kneading an antistatic agent into plastics.
2. Methods which involve applying an antistatic agent (surfactant) over the surface of plastics.
3. Methods which involve applying a silicone compound over the surface of plastics.
4. Methods which involve chemically reforming the molecular structure of plastics.

Of these methods, a method which involves kneading an antistatic agent into plastics cannot successfully impart a permanent antistatic effect, and, when the antistatic agent present over the surface of the plastics is removed by washing with water or rubbing, the antistatic effect is lost.

Further, if an antistatic agent bleeds excessively over the surface of plastics, dust and dirt adhere thereonto.

Since the antistatic agent must be present over the surface of a shaped article obtained from plastics in appropriate quantity, shaping or processing conditions will be extremely limited.

The method which involves applying a surfactant over the surface of plastics requires a step of uniformly applying the surfactant over the surface of a shaped plastic article, and further the surfactant is easily removed by washing or rubbing whereby the antistatic effect is drastically impaired.

The method which involves chemically reforming the molecular structure of plastics by introducing hydrophilic groups into plastics by polymerization and the like generally requires the introduction of a considerable quantity of hydrophilic groups in order to obtain a high antistatic effect, so that the mechanical and other properties of the plastics deteriorate because of the increased hygroscopicity thereof.

In the course of our research on processes for producing resins possessing permanent antistatic property that is not lowered by washing, we obtained a rubber trunk polymer having a low specific volume resistivity. We further found that a graft copolymer obtained by graft-polymerizing a vinyl or vinylidene monomer onto the rubber trunk polymer alone or a mixture of this graft copolymer and a resin compatible therewith has a permanent antistatic effect, and that a copolymer comprising 1 to 50% (by weight, as in all percentages and parts set forth hereinafter) of a monomer comprising 4 to 500 alkylene oxide groups and 50 to 99% of an acrylate is suitable as the rubber trunk polymer (U.S. Patent Ser. No. 72,846, Masaki OHYA et al.).

SUMMARY OF THE INVENTION

As a result of our more intensive research, we have found that, when the above stated graft copolymer (simply grafted copolymer or two layer graft copolymer) is replaced by a multiply grafted copolymer comprising a core non-elastic layer, an intermediate elastic layer comprising copolymerized units of an elasticity-imparting monomer and a polyalkylene oxide monomer, and an outermost resin layer, the volume of the rubber phase in the matrix resin apparently increases so that improved antistatic property can be obtained in comparison with a simply grafted copolymer with the same rubber content, and that the same level of antistatic property can be obtained with a reduced rubber content. On the basis of these findings, we have arrived at the present invention.

More specifically, the antistatic resin composition according to the present invention comprises a multiply grafted copolymer which in turn comprises (a) 5 to 70% of non-elastic trunk polymer particles; (b) 5 to 60% of an intermediate elastic layer obtained by graft-polymerizing onto the polymer particles a monomer mixture comprising (i) 50 to 95% of an elasticity-imparting monomer selected from the group consisting of conjugated dienes and acrylates, (ii) 5 to 50% of a polyalkylene oxide monomer comprising 4 to 500 alkylene oxide groups together with a polymerizable unsaturated double bond at the terminal, and optionally, (iii) 0 to 45% of an ethylenically unsaturated monomer copolymerizable with the elasticity-imparting monomer; and (c) 5 to 90% of an outer resin layer obtained by graft-polymerizing an ethylenically unsaturated monomer onto the intermediate elastic layer.

The antistatic resin composition of this invention may be either the aforesaid multiply grafted copolymer alone or a mixture of this copolymer and a thermoplastic resin compatible therewith.

DETAILED DESCRIPTION OF THE INVENTION

Although the resin composition of the present invention, of course, has a satisfactory antistatic effect without the aid of an antistatic agent, this effect can be improved by the addition of an antistatic agent. The antistatic property thus improved, unlike that obtained by a conventional kneading-in method, is not practically lowered by washing or wiping.

The reason why such improved antistatic effect can be obtained is uncertain, but one possible reason may be that an antistatic resin prepared by a conventional kneading-in method exhibits an antistatic effect due to an antistatic agent present on the surface of a shaped resin article while the resin composition of the present invention due to an antistatic agent present at the interface between the rubber layer and the core or outer layer and within the rubber layer of the shaped article.

Since the matrix resin need not be modified to be hydrophilic, the overall properties of the composition of this invention will not appreciably be affected even if the rubber phase absorbs moisture. By suitably controlling the particle size, quantity and refractive index of the rubber phase, a transparent resin composition possessing improved impact strength can be obtained.

Processes for preparing resin compositions possessing an antistatic property by copolymerizing monomers comprising polyalkylene oxide groups are disclosed, for example, in Japanese Patent Laid-Open Publications No. 18521/1973, No. 29526/1976 and No. 78642/1975. However, all of the resins obtained by these processes are random copolymers of monomers comprising polyalkylene oxide groups or mixtures thereof with other polymers. If the monomers comprising polyalkylene oxide groups are used in small quantity, excellent antistatic property cannot be obtained, while these monomers in large quantity increase the hygroscopicity of the resin composition.

In contrast, it is essential in the present invention that the monomer comprising polyalkylene oxide groups be present as a constituent of the rubbery polymer. The resin composition of this invention exhibits a remarkable antistatic effect presumably because the rubbery polymer is dispersed in the matrix resin in mutually bridged state, and the electric charge is reduced mainly due to diffusion through the rubbery polymer.

In the graft copolymer of the present invention, the rubbery polymer encases particles of the non-elastic trunk polymer which forms a core with the result that the volume of the rubbery polymer apparently increases as much and the bridge structure can be formed more easily than a simply grafted copolymer comprising a rubbery polymer as a core as described in Japanese Patent Laid-Open Publication No. 36237/1980 whereby an enhanced antistatic effect can be obtained or the content of the rubbery polymer can be reduced.

In the resin composition of this invention, the hygroscopicity of the core non-elastic trunk polymer or outer non-elastic matrix resin undergoes substantially no change even if the hygroscopicity of the rubbery polymer increases, and hence the mechanical strength or heat resistance of the composition is not appreciably reduced.

As has been set forth hereinabove, the monomer comprising alkylene oxide groups must be present in the rubber trunk polymer or more specifically in the intermediate rubber or elastic polymer layer (b) on which the outer non-elastic polymer layer (c) is provided by graft-polymerization. In the case where this monomer is present, not as a constituent of the rubber trunk polymer, but as a constituent of a random copolymer, a polymer possessing excellent antistatic property cannot be obtained as in the present invention with the same quantity of the monomer.

The rubbery polymer (b) of the present invention is a rubbery copolymer of 50 to 95% of an elasticity-imparting monomer selected from conjugated idenes and acrylates, 5 to 50% of a polyalkylene oxide monomer comprising 4 to 500 alkylene oxide groups together with an ethylenic unsaturation, and optionally 0 to 45% of an ethylenically unsaturated monomer copolymerizable with the elasticity-imparting monomer.

For the conjugated dienes, 1,3-butadiene, isoprene, 1,3-pentadiene and chloroprene can be used.

For the acrylates, methyl acrylate, ethyl acrylate, propyl acrylate, butyl acrylate, hexyl acrylate, octyl acrylate, and nonyl acrylate can be used.

The sum of the quantities of the conjugated diene and acrylate amounts to 50 to 95% of the rubber polymer (b). If this sum is less than 50%, the rubber polymer (b) cannot have a sufficiently low glass transition temperature, resulting in a poorer antistatic effect. Conversely, in the case where this sum is greater than 95%, the quantity of the polyalkylene oxide monomer to be added will necessarily be reduced, and thus the desired antistatic effect cannot be obtained.

The polyalkylene oxide monomer comprises, in addition to an ethylenic unsaturation, a polyalkylene oxide chain or block represented by the formula:

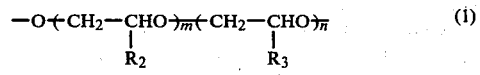

wherein each of $R_2$ and $R_3$, which may be the same or different, is hydrogen or an alkyl group having 1 to 4 carbon atoms, and m and n are integers that meet the requirement $4 \leq m+n \leq 500$. Particularly, a polyalkylene oxide monomer in which at least one of $R_2$ and $R_3$ is hydrogen and which comprises a polyethylene oxide block consisting of 4 or more ethylene oxide groups is preferred.

A preferred polyalkylene oxide monomer is one or more monomers represented by the following formulas (2)-(4):

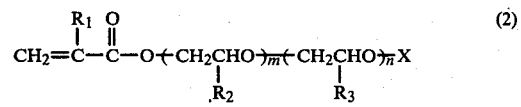

wherein $R_1$ is hydrogen or an alkyl group having 1 to 4 carbon atoms; X is hydrogen, an alkyl group having 1 to 9 carbon atoms, a phenyl group, $SO_3Me$, $SO_2Me$, $PO_3Me_2$,

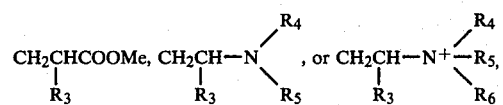

each of $R_4$, $R_5$ and $R_6$ being hydrogen or an alkyl group having 1 to 9 carbon atoms, and Me being hydrogen, Na, Li or K; and $R_2$, $R_3$, m, and n have the same meaning as in the formula (1),

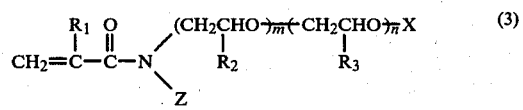

wherein Z is hydrogen, an alkyl group having 1 to 4 carbon atoms, a cycloalkyl group having 3 to 6 carbon atoms, a phenyl group, or

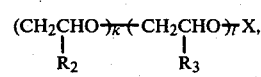

k and l being integers that meet the requirement $4 \leq k+l \leq 500$; and $R_1$ to $R_3$, X, Me, m, and n are as defined above, and

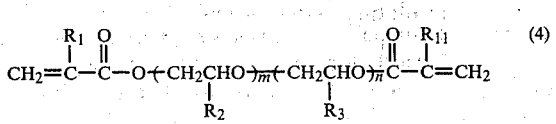

$$(4)$$

wherein $R_1$ to $R_3$, m and n are as defined previously, and $R_{11}$ is hydrogen or an alkyl group having 1 to 4 carbon atoms.

Among the monomers represented by the formula (2), (3) or (4), those in which at least one of $R_2$ and $R_3$ is hydrogen and which comprise 4 or more ethylene oxide groups are particularly preferable as mentioned earlier.

It is of course possible, however, to use analogous monomers other than the monomers represented by the formula (2), (3) or (4), which comprise an ethylenic unsaturation together with polyalkylene oxide groups and further can lower the volume resistivity of the rubber trunk polymer obtained by copolymerization with an elasticity-imparting monomer.

The polyalkylene oxide monomer comprises 4 to 500, preferably 6 to 50, and more preferably 9 to 50, alkylene oxide groups. In the case where the quantity of the alkylene oxide groups is less than 4, it is difficult to obtain an antistatic property. A polyalkylene oxide monomer comprising more than 500 alkylene oxide groups, when subjected to polymerization, is not easily soluble in water or other monomers, resulting in poor polymerizability.

Further, if the quantity of the polyalkylene oxide monomer is less than 5% of the rubber polymer (b), an antistatic property cannot be obtained. Conversely, in case this monomer is used in a quantity exceeding 50%, there arises some difficulty in the polymerization required for the formation of the rubber trunk polymer or the graft copolymer as well as in post-treatments of the polymer obtained such as precipitation with an acid or salting out.

For ethylenically unsaturated monomers copymerizable with the elasticity-imparting monomer which are optionally used in the preparation of the rubber trunk polymer, known monomers can be utilized.

For example, one or more monomers selected from alkyl methacrylates, acrylic acid, methacrylic acid, acrylamide, methacrylamide, vinyl acetate, unsaturated nitriles, aromatic vinyl monomers, alkyl vinyl ethers, alkyl vinyl ketones, 2-hydroxyethyl (meth)acrylate, diacetone acrylamide, vinyl chloride, vinylidene chloride, itaconic acid, alkyl itaconates, isobutene, 2-acid phosphoxyethyl methacrylate, 3-chloro-2-acid phosphoxypropyl methacrylate, and sodium styrenesulfonate can be used.

Improved antistatic property can be obtained by selecting as the above enumerated ethylenically unsaturated monomers copolymerizable with the elasticity-imparting monomer highly polar monomers such as acrylonitrile or monomers having an anionic substituent such as a sulfonate group, phosphate group or carboxylate group.

These ethylenically unsaturated monomers are used in a quantity of 45% or less of the monomer mixture which provides the rubber trunk polymer. If this quantity is larger than 45%, the glass transition temperature becomes higher and the rubbery property of the trunk polymer is lost.

The rubbery graft layer (b) can optionally comprise as a crosslinking agent a polyfunctional monomer having two or more of at least one species of ethylenically unsaturated groups, such as vinyl group, 1,3-butadienyl group, acrylic group, methacrylic group, and allyl group, in a quantity of up to 10% of the rubbery graft layer. A polyfunctional monomer further comprising 4 to 500, preferably 6 to 50, polyalkylene glycol groups is particularly preferred because such a monomer acts as a crosslinking agent and simultaneously serves as an antistatic property modifier.

For the ethylenically unsaturated monomers to be used for polymerization of the core non-elastic trunk polymer particles (a) and the outermost non-elastic layer (c) of the multiply grafted copolymer of the present invention, known monomers can be employed. For example, one or more monomers selected from alkyl acrylates, alkyl methacrylates, acrylic acid, methacrylic acid, acrylamide, methacrylamide, vinyl acetate, unsaturated nitriles, aromatic vinyl monomers, conjugated dienes, alkyl vinyl ethers, alkyl vinyl ketones, 2-hydroxyethyl (meth)acrylate, (alkoxy)polyethylene glycol (meth)acrylates, diacetone acrylamide, vinyl chloride, vinylidene chloride, itaconic acid, alkyl itaconates, and isobutene can be used.

Further, improved antistatic property can be more effectively obtained by adding 0.01 to 10%, preferably 0.1 to 3%, of a crosslinking agent in the polymerization of the non-elastic trunk polymer (a). While the reason for this is not sufficiently clear, the crosslinking agent may prevent destruction of the multilayer structure when the resin composition is molten during processing.

An effective and preferred crosslinking agent that can be used in the polymerization of the trunk polymer is, for example, a polyfunctional monomer having two or more of at least one species of ethylenically unsaturated groups, such as vinyl group, 1,3-butadienyl group, acrylic group, methacrylic group, and allyl group.

The proportions of the non-elastic trunk polymer particles (a), elastic layer (b) and outermost resin layer (c) in the multiply grafted copolymer respectively range from 5 to 70%, preferably from 10 to 40%; from 5 to 60%, preferably from 10 to 40%; and from 5 to 90%, preferably from 20 to 80%.

Less than 5% of the non-elastic trunk polymer particles (a) cannot increase the apparent or effective volume of the elastic layer (b). If the proportion of the trunk polymer particles (a) exceeds 70%, the resin composition cannot easily be shaped while retaining a multilayer structure.

In the case where the proportion of the elastic layer (b) is lower than 5%, it is difficult to obtain the desired antistatic effect. Above 60%, the entire multiply grafted copolymer becomes rubbery and difficult to handle.

Further, less than 5% of the outermost resin layer (c) results in poor compatibility with the matrix while this layer (c) in excess of 90% gives a lower antistatic effect.

While the multiply grafted copolymer of the present invention endowed with improved antistatic property can be prepared by an ordinary graft polymerization process using emulsion polymerization in the presence of a radical initiator, suspension polymerization or bulk polymerization, emulsion polymerization is most suitable for effectively controlling the particle size or dispersion of the rubber trunk polymer.

The monomers for the branch polymer (b) or (c) may be polymerized either at one time or, in the case where the polymerization entails intense heat or monomers having different reactivities are used together, may be added and polymerized intermittently or continuously in accordance with a conventional process to prepare the desired multiply grafted copolymer.

Since the polymerization yield of the graft copolymer of this invention is nearly 100%, the composition thereof is substantially identical with that of the monomers charged.

The antistatic resin composition of the present invention can be a multiply grafted copolymer thus obtained alone as has been set forth hereinbefore. A resin composition possessing excellent antistatic property can also be obtained by blending with 10 to 99.9 parts of the multiply grafted copolymer 0.1 to 90 parts of a thermoplastic resin compatible therewith, the sum of the quantities of the multiply grafted copolymer and the thermoplastic resin amounting to 100 parts. In this case, however, it is essential that the ratio of the elastic layer (b) to the total of the multiply grafted copolymer and the thermoplastic resin be 5 to 60%, preferably 8 to 40%. A percentage of less than 5% of the elastic layer (b) cannot readily produce antistatic property, while that in excess of 60% results in low heat resistance and poor processability.

Examples of thermoplastic resins to be used in combination with the multiply grafted copolymer are polyethylene, polypropylene, polyvinyl chloride, polyvinylidene chloride, aromatic vinyl polymers, nitrile resins, polymethyl methacrylate and the copolymers thereof, acrylonitrile-styrene-butadiene resins, acrylonitrile-styrene resins, polycarbonates, polyamide resins, polyester resins, and fluororesins. Needless to say, any other thermoplastic resins that are compatible with the multiply grafted copolymer can be used.

As has been mentioned earlier, the resin composition of this invention can also comprise an antistatic agent preferably at a ratio of 0.1 to 5 parts per 100 parts of the multiply grafted copolymer or a mixture thereof and a thermoplastic resin. For the antistatic agents, anionic or cationic surfactants are preferred, and anionic surfactants are especially preferred.

In accordance with the present invention, transparent resin products can easily be obtained by adjusting the refractive indices of the non-elastic trunk polymer particles, elastic layer and outermost resin layer to substantially the same level, although the products of this invention are not limited to transparent products.

The resin composition of the present invention possessing excellent antistatic property can be formed or molded by an ordinary process, for example, injection molding, extrusion molding, compression molding, or vacuum forming. Accordingly, this resin composition can be formed into plastic moldings, sheets, films, tubes, and fibers.

The resin composition of the present invention is suitable for use, for instance, in electrical appliances or accessories thereof (e.g., cassette tape recorder cases, front covers of picture tubes, record player covers, dust collectors of vacuum cleaners, and IC element casings); packaging materials (e.g., doll cases, cans, bottles and packaging films); acoustic materials (e.g., audio discs, video discs, and tapes for tape recorders); building materials (e.g., wall materials, flooring materials, panels, and window materials); lighting equipment (e.g., lamp shades, and displays); and plastics in general wherein an antistatic property is required.

In order to indicate more fully the nature and utility of this invention, the following specific examples of practice constituting preferred embodiments of the invention and comparison examples are set forth, it being understood that these examples are presented as illustrative only and not intended to limit the scope of the invention.

Test specimens were measured 7 days after forming upon adjusting their moisture content and 7 days after washing with water as described in Example 1. The data obtained show that the resin products according to the present invention have satisfactory antistatic property immediately after forming or washing with water. Thus, the antistatic property achieved by the present invention is not due to bleeding of the antistatic agent over the surface of the resin product with the elapse of time nor due to the moisture absorbed after forming or washing with water.

The test specimens used in Examples were prepared by pressing the resultant resin powder after kneading the powder with heated rolls. However, substantially the same results can be obtained with specimens prepared by extrusion molding through an extruder.

EXAMPLE 1

An aqueous dispersion composed of the following ingredients was adjusted to a pH of 5 with dilute sulfuric acid and charged into a 10-l stainless steel autoclave provided with agitating blades.

|     |                              | part  |
| --- | ---------------------------- | ----- |
| (a) | methyl methacrylate          | 17    |
|     | butyl acrylate               | 2     |
|     | styrene                      | 1     |
|     | divinylbenzene               | 0.2   |
|     | potassium persulfate         | 0.008 |
|     | sodium hydrogensulfite       | 0.002 |
|     | sodium dodecylbenzenesulfonate | 0.2 |
|     | deionized water              | 60    |

The atmosphere within the autoclave was thoroughly purged with nitrogen, and the reaction mixture was agitated at 50° C. for 10 hours, whereupon a seed latex of an average particle size of $0.07\mu$ was obtained in a yield of 99%.

To 80 parts (20 parts as a resin) of this seed latex were added the following ingredients.

|     |                                                                                   | part  |
| --- | --------------------------------------------------------------------------------- | ----- |
| (b) | 1,3-butadiene                                                                     | 8     |
|     | butyl acrylate                                                                    | 7     |
|     | methoxypolyethylene glycol methacrylate (having an average of ca. 9 ethylene oxide groups) | 4 |
|     | methacrylic acid                                                                  | 1     |
|     | potassium persulfate                                                              | 0.008 |
|     | sodium hydrogensulfite                                                            | 0.002 |
|     | sodium dodecylbenzenesulfonate                                                    | 0.2   |
|     | sodium polyoxyethylene lauryl ether sulfate (having an average of 4 ethylene oxide groups) | 0.4 |
|     | deionized water                                                                   | 60    |

The resulting aqueous dispersion was adjusted to a pH of 5, and the atmosphere within the autoclave was purged with nitrogen. The reaction mixture was subjected to polymerization at 50° C. for 20 hours to obtain a graft copolymer latex in a yield of 99%.

To 160 parts (40 parts as a resin) of the graft copolymer latex thus obtained were further added the following ingredients.

|     |                                  | part  |
| --- | -------------------------------- | ----- |
| (c) | methyl methacrylate              | 51    |
|     | butyl acrylate                   | 6     |
|     | styrene                          | 3     |
|     | normal octylmercaptan            | 0.36  |
|     | potassium persulfate             | 0.024 |
|     | sodium hydrogensulfite           | 0.006 |
|     | sodium dodecylbenzenesulfonate   | 0.6   |
|     | deionized water                  | 180   |

The aqueous dispersion was adjusted again to a pH of 5, and the atmosphere was thoroughly purged with nitrogen. The reaction mixture was agitated for polymerization at 50° C. for 20 hours to obtain a multiply grafted copolymer latex.

The resulting latex was withdrawn from the autoclave, and then subjected to deposition with an aqueous aluminum sulfate solution, adjusted to a pH of 7 with an aqueous sodium pyrophosphate solution, dehydrated, washed, and dried at 55° C. for 24 hours. As a result, a white powder was obtained in a yield of 99%.

This powder was kneaded with rolls at 150° C. for 3 min. to prepare test specimens each in the form of a sheet of about 0.7 mm thickness. These test specimens were stored under normal conditions of 23° C. and 50% RH for a week, and thereafter the saturation charged voltage and the half-life of the charged voltage of each of the specimens were measured by means of a Static Honest Meter (mfd. by Shishido Shokai, Japan) to evaluate the antistatic property thereof. The results obtained are shown in Table 1 appearing hereinafter.

The measurement conditions were as follows.

| Applied voltage | 8,000 V     |
| --------------- | ----------- |
| Distance        | 20 mm       |
| Rotational speed| 1,300 rpm   |
| Humidity        | 50-55% RH   |
| Temperature     | 23° C.      |
| Time period     | 1 min.      |

In order to evaluate the antiwashing property, the surface of each test specimen was thoroughly washed with an aqueous solution of a commercially available detergent (mfd. by Lion Yushi K.K., Japan, under the trade name "Mama Lemon") and then thoroughly washed with distilled water. The specimens were stored under the conditions of 50% RH and 23° C. for a week to adjust their moisture content, whereafter the saturation charged voltage and the half-life of the charged voltage were measured by means of the Static Honest Meter. The results are set forth in Table 1.

COMPARISON EXAMPLE 1

An aqueous dispersion composed of the following ingredients was adjusted to a pH of 5 and charged into a 10-l stainless steel autoclave provided with agitating blades.

|     |                                                                          | part  |
| --- | ------------------------------------------------------------------------ | ----- |
| (a) | 1,3-butadiene                                                            | 8     |
|     | butyl acrylate                                                           | 7     |
|     | methoxypolyethylene glycol methacrylate (having an average of ca. 9 ethylene oxide groups) | 4     |
|     | methacrylic acid                                                         | 1     |
|     | potassium persulfate                                                     | 0.008 |
|     | sodium hydrogensulfite                                                   | 0.002 |

-continued

|                                                                                   | part |
| --------------------------------------------------------------------------------- | ---- |
| sodium dodecylbenzenesulfonate                                                    | 0.2  |
| sodium polyoxyethylene lauryl ether sulfate (having an average of 4 ethylene oxide groups) | 0.4  |
| deionized water                                                                   | 60   |

The atmosphere within the autoclave was thoroughly purged with nitrogen, and the reaction mixture was agitated at 50° C. for 20 hours, whereupon a rubber latex was obtained in a yield of 99%.

To 80 parts (20 parts as a resin) of this rubber latex were added the following ingredients.

|     |                                  | part  |
| --- | -------------------------------- | ----- |
| (b) | methyl methacrylate              | 68    |
|     | butyl acrylate                   | 8     |
|     | styrene                          | 4     |
|     | normal octylmercaptan            | 0.48  |
|     | potassium persulfate             | 0.032 |
|     | sodium hydrogensulfite           | 0.008 |
|     | sodium dodecylbenzenesulfonate   | 0.8   |
|     | deionized water                  | 240   |

The resulting aqueous dispersion was adjusted to a pH of 5, and the atmosphere was purged with nitrogen. The reaction mixture was agitated for polymerization at 50° C. for 20 hours to obtain a graft copolymer latex.

This latex was subjected to post-treatments similarly as in Example 1, and, as a result, a white powder was obtained in a yield of 99%.

Test specimens were prepared by the procedure of Example 1 from the powder thus obtained, and the saturation charged voltage and the half-life of the charged voltage of each of the specimens were measured by means of the Static Honest Meter. The results are shown in Table 1.

TABLE 1

|                      | Saturation charged voltage (v) | | Half-life of charged voltage (sec.) | |
| -------------------- | --------- | ------------ | --------- | ------------ |
|                      | Untreated | Washed with water | Untreated | Washed with water |
| Example 1            | 730       | 700          | <1        | <1           |
| Comparison Example 1 | 1650      | 1650         | 26        | 24           |

EXAMPLES 2 THROUGH 11 AND COMPARISON EXAMPLES 2 AND 3

Test specimens were prepared substantially as in Example 1 except that the monomer composition of the multiply grafted copolymer used therein was modified as shown in Table 2.

The results of the measurements by means of the Static Honest Meter are summarized in Table 2.

The symbols used in Table 2 and all succeeding tables denote the following.

| MMA | methyl methacrylate |
| --- | ------------------- |
| But | 1,3-butadiene       |
| BA  | butyl acrylate      |
| St  | styrene             |
| MAA | methacrylic acid    |
| AN  | acrylonitrile       |
| MA  | methyl acrylate     |
| M1  | methoxypolyethylene glycol methacrylate (having an average of ca. 9 ethylene oxide groups) |

-continued

| | |
|---|---|
| M2 | methoxypolyethylene glycol methacrylate (having an average of ca. 23 ethylene oxide groups) |
| M3 | polyethylene glycol acrylamide (having an average of ca. 23 ethylene oxide groups) |
| M4 | methoxypolyethylene glycol acrylate (having an average of ca. 14 ethylene oxide groups) |
| NOM | normal octylmercaptan |
| DVB | divinylbenzene |
| EDA | ethylene glycol diacrylate |

-continued

| | part |
|---|---|
| acrylate (having an average of 23 ethylene oxide groups) | 24 |
| Outermost resin layer | |
| methyl methacrylate | 16 |
| styrene | 4 |

35 parts each of the multiply grafted copolymers and 65 parts each of the commercially available thermoplas-

TABLE 2

| | Monomer composition (part by wt.) | | | | | | | | | | | | |
|---|---|---|---|---|---|---|---|---|---|---|---|---|---|
| | Non-elastic trunk polymer particles | | | | Elastic layer | | | | | Outermost resin layer | | | |
| Example 2 | MMA 17 | BA 2 | St 1 | | But 8 | BA 7 | M1 4 | MAA 1 | MMA 51 | BA 6 | St 3 | NOM 0.36 |
| Example 3 | MMA 51 | BA 6 | St 3 | DVB 0.6 | But 8 | BA 7 | M1 4 | MAA 1 | MMA 17 | BA 2 | St 1 | NOM 0.1 |
| Example 4 | MMA 8.5 | BA 1 | St 0.5 | DVB 0.1 | But 8 | BA 7 | M1 4 | MAA 1 | MMA 59.5 | BA 7 | St 3.5 | NOM 0.42 |
| Example 5 | MMA 8.5 | BA 1 | St 0.5 | DVB 0.1 | But 4 | BA 3.5 | M1 2 | MAA 0.5 | MMA 68 | BA 8 | St 4 | NOM 0.48 |
| Example 6 | MMA 34 | BA 4 | St 2 | DVB 0.4 | But 16 | BA 14 | M1 8 | MAA 2 | MMA 17 | BA 2 | St 1 | NOM 0.1 |
| Example 7 | MMA 17 | BA 2 | St 1 | DVB 0.2 | But 8 | BA 7 | M2 4 | MAA 1 | MMA 51 | BA 6 | St 3 | NOM 0.36 |
| Example 8 | MMA 17 | BA 2 | St 1 | DVB 0.2 | But 8 | BA 7 | M3 4 | MAA 1 | MMA 51 | BA 6 | St 3 | NOM 0.36 |
| Example 9 | AN 12 | MA 8 | EDA 0.2 | | But 16 | M2 4 | | | AN 36 | MA 24 | NOM 2.4 | |
| Example 10 | MMA 20 | DVB 0.2 | | | BA 12 | M4 8 | EDA 0.5 | | MMA 60 | NOM 0.48 | | |
| Example 11 | St 24 | But 6 | | | But 15 | ST 3 | M2 12 | | St 40 | NOM 0.2 | | |
| Comparison Example 2 | MMA 17 | BA 2 | St 1 | DVB 0.2 | But 10 | BA 8.5 | M1 0.5 | MAA 1 | MMA 51 | BA 6 | St 3 | NOM 0.36 |
| Comparison Example 3 | MMA 17 | BA 2 | St 1 | DVB 0.2 | But 1.6 | BA 1.4 | M1 0.8 | MAA 0.2 | MMA 62 | BA 10 | St. 4 | NOM 0.40 |

| | Saturation charged voltage (v) | | Half-life of charged voltage (sec) | |
|---|---|---|---|---|
| | Untreated | Washed with water | Untreated | Washed with water |
| Example 2 | 1000 | 980 | 1.5 | 1.3 |
| Example 3 | 650 | 610 | <1 | <1 |
| Example 4 | 880 | 850 | <1 | <1 |
| Example 5 | 1200 | 1150 | 5.0 | 4.7 |
| Example 6 | 190 | 180 | <1 | <1 |
| Example 7 | 520 | 500 | <1 | <1 |
| Example 8 | 770 | 760 | <1 | <1 |
| Example 9 | 1200 | 1110 | 2.3 | 2.0 |
| Example 10 | 480 | 450 | <1 | <1 |
| Example 11 | 820 | 810 | <1 | <1 |
| Comparison Example 2 | 1720 | 1690 | >300 | >300 |
| Comparison Example 3 | 1730 | 1710 | >300 | >300 |

EXAMPLES 12 THROUGH 15

White powders of multiply grafted copolymers were obtained respectively in a yield of 99% substantially as in Example 1 except that the monomer composition was modified as follows:

| | part |
|---|---|
| Non-elastic trunk polymer particles | |
| methyl methacrylate | 17 |
| butyl acrylate | 2 |
| styrene | 1 |
| divinylbenzene | 0.2 |
| Elastic layer | |
| 1,3-butadiene | 36 |
| methoxypolyethylene glycol meth- | | tic resin pellets shown in Table 3 were kneaded for 3 min. with rolls heated to 165° C. to prepare test specimens each in the form of a sheet of about 0.7 mm thickness.

The electrical properties of these specimens were measured in the same manner as in Example 1, and the results set forth in Table 3 were obtained.

EXAMPLES 16, 17 AND 18

Test specimens were prepared by the procedure of Example 1 from 100 parts each of the multiply grafted copolymers used in Examples 9, 10 and 11 and 0.5 part of sodium dodecylbenzenesulfonate added thereto, and the saturation charged voltage and the half-life of the charged voltage were measured by means of the Static Honest Meter. The results obtained are given in Table 4.

TABLE 3

| Example No. | Commercially available thermoplastic resin pellet | Saturation charged voltage (v) | | Half-life of charged voltage (sec) | |
| --- | --- | --- | --- | --- | --- |
| | | Untreated | Washed with water | Untreated | Washed with water |
| 12 | DELPET 60N*1 (Asahi Dow) | 720 | 730 | <1 | <1 |
| 13 | TOYOLAC 500*2 (Toray, K.K.) | 510 | 510 | <1 | <1 |
| 14 | TYRIL 780*3 (Asahi Dow) | 480 | 460 | <1 | <1 |
| 15 | STYLON 666*4 (Asahi Dow) | 820 | 810 | <1 | <1 |

*1 polymethyl methacrylate resin
*2 acrylonitrile-butadiene-styrene resin
*3 acrylonitrile-styrene resin
*4 polystyrene resin

TABLE 4

| Example No. | Multiply grafted copolymer powder | Saturation charged voltage (v) | | Half-life of charged voltage (sec.) | |
| --- | --- | --- | --- | --- | --- |
| | | Untreated | Washed with water | Untreated | Washed with water |
| 16 | same as Example 9 | 230 | 210 | <1 | <1 |
| 17 | same as Example 10 | 50 | 40 | <1 | <1 |
| 18 | same as Example 11 | 120 | 110 | <1 | <1 |

We claim:

1. An antistatic resin composition comprising a multiply grafted copolymer which in turn comprises:
   (a) 5 to 70% of non-elastic trunk polymer particles;
   (b) 5 to 60% of an intermediate elastic layer obtained by graft-polymerizing onto the polymer particles a monomer mixture comprising
      (i) 50 to 95% of an elasticity-imparting monomer selected from the group consisting of conjugated dienes and acrylates,
      (ii) 5 to 50% of a polyalkylene oxide monomer comprising 4 to 500 alkylene oxide groups together with a polymerizable unsaturated double bond at the terminal, and optionally
      (iii) 0 to 45% of an ethylenically unsaturated monomer copolymerizable with the elasticity-imparting monomer; and
   (c) 5 to 90% of an outer resin layer obtained by graft-polymerizing an ethylenically unsaturated monomer onto the intermediate elastic layer,
   all quantities expressed in percentages and parts being by weight.

2. An antistatic resin composition as claimed in claim 1, wherein the composition comprises a mixture of 99.9 to 10 parts of the multiply grafted copolymer and 0.1 to 90 parts of a thermoplastic resin compatible therewith, the sum of the quantities of the multiply grafted copolymer and the thermoplastic resin amounting to 100 parts, and the quantity of the elastic layer comprising polymerized units of the grafting monomers (b) in claim 1 is 5 to 60% of the mixture.

3. An antistatic resin composition as claimed in claim 1 or 2, wherein the polyalkylene oxide monomer comprises, in addition to the polymerizable unsaturated double bond at the terminal, a polyalkylene oxide chain or block represented by the formula:

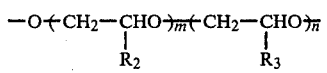

wherein each of $R_2$ and $R_3$, which may be the same or different, is hydrogen or an alkyl group having 1 to 4 carbon atoms, and m and n are integers that meet the requirement $4 \leq m+n \leq 500$.

4. An antistatic resin composition as claimed in claim 1 or 2, wherein the grafting monomers (b) comprise up to 10% thereof of a polyfunctional monomer having two or more ethylenic unsaturations.

5. An antistatic resin composition as claimed in claim 1 or 2, wherein the non-elastic trunk polymer particles (a) have been obtained by polymerizing ethylenically unsaturated monomers in the presence of 0.01 to 10% of a crosslinking agent.

6. An antistatic resin composition as claimed in claim 1 or 2, wherein the multiply grafted copolymer has been obtained by graft-polymerizing onto 10 to 40% of the non-elastic trunk polymer particles (a) 10 to 40% of the grafting monomer mixture (b), and 20 to 80% of the ethylenically unsaturated monomer (c) in order.

7. An antistatic resin composition as claimed in claim 1 or 2, wherein the composition comprises 100 parts of a base resin and 0.1 to 5 parts of an antistatic agent, said base resin being selected from the group consisting of the multiply grafted copolymer and mixtures thereof with thermoplastic resins compatible therewith.

8. An antistatic resin composition as claimed in claim 7, wherein the antistatic agent comprises an anionic surfactant.

* * * * *